No. 852,921. PATENTED MAY 7, 1907.
L. A. ASPINWALL.
CLUTCH DEVICE FOR AGRICULTURAL MACHINES.
APPLICATION FILED JUNE 13, 1906.
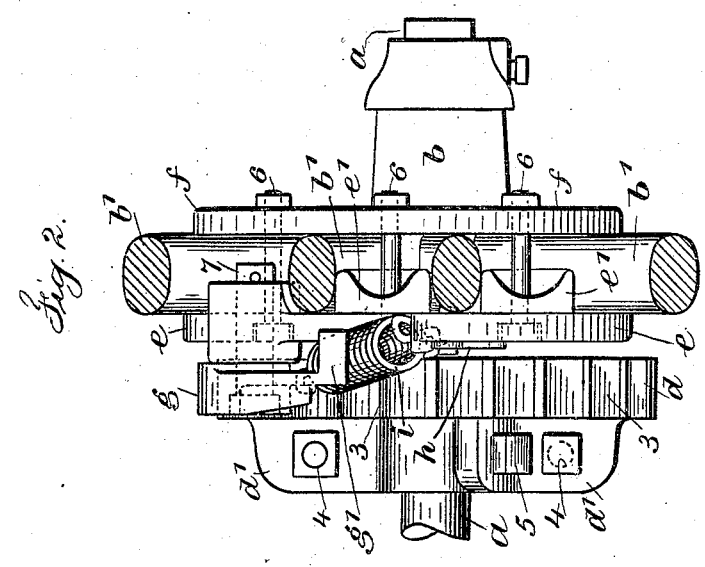
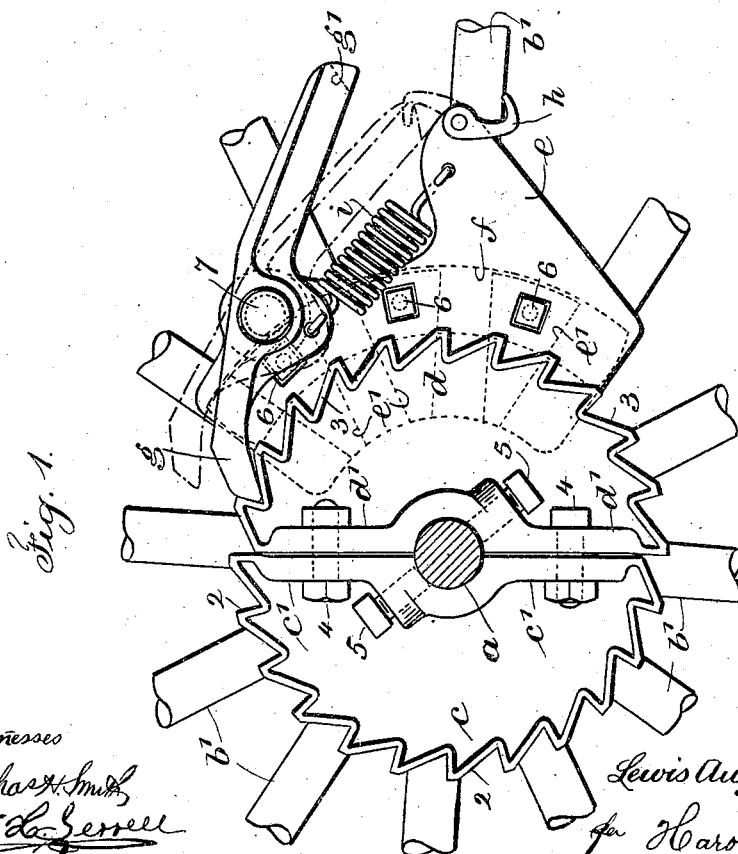

UNITED STATES PATENT OFFICE.

LEWIS AUGUSTUS ASPINWALL, OF JACKSON, MICHIGAN, ASSIGNOR TO ASPINWALL MANUFACTURING COMPANY, OF JACKSON, MICHIGAN, A CORPORATION OF MICHIGAN.

CLUTCH DEVICE FOR AGRICULTURAL MACHINES.

No. 852,921.     Specification of Letters Patent.     Patented May 7, 1907.

Application filed June 13, 1906. Serial No. 321,440.

*To all whom it may concern:*

Be it known that I, LEWIS AUGUSTUS ASPINWALL, a citizen of the United States, residing at Jackson, in the county of Jackson and State of Michigan, have invented a new and useful Improvement in Clutch Devices for Agricultural Machines, of which the following is a specification.

My invention relates to a peculiar and special form of clutch device for agricultural machines by means of which while the machine is being moved about from place to place or along the road and no work is being done, the operative mechanism will be free from the main wheels which ordinarily communicate the power of their rotation to such mechanism, and the mechanism will be at rest.

In the device of my improvement I employ a two-part or divisible ratchet with means for clamping the parts together around and to the axle. Parallel plates are clamped by suitable bolts to opposite sides of the spokes of one wheel. One of these plates carries a pawl adapted to engage said ratchet and a catch-hook adapted to engage a lug of the pawl against the action of a helical spring, the office of which spring is to keep the pawl in engagement with the teeth of the ratchet.

When the catch-hook engages the pawl it is held away from the ratchet and the parts are separated so that the rotation of the wheel is not communicated to the mechanism of the machine.

In the drawing, Figure 1 is an elevation representing the device of my improvement and section of the main axle; the elevation being from inside of one of the wheels, and Fig. 2 is a section and elevation of the same at right angles to Fig. 1.

The device of my invention is applicable to the potato digger and liquid sprayer devices heretofore manufactured by myself and is also applicable to mowing machines and other agricultural machines; in fact to all agricultural machines where the rotation of one of the main wheels is employed as a motor for imparting the power of its movement to operate its mechanism.

$a$ represents a main axle of the machine, $b$ the wheel hub and $b'$ the wheel spokes. The two-part or divisible ratchet is composed of the ratchet members $c$ $d$ which are substantially alike but reversed and formed with flanges $c'$ $d'$ and peripheral teeth 2 3. These flanges have parallel portions through which pass the connecting bolts 4, and said flanges have semi-circular recesses receiving the axle and gripping the axle upon the application of the said connecting bolts 4. These flanges also have circular portions surrounding the axle and intervening projections with faces arranged with reference to the axle so as to receive the radially placed set-bolts 5; the bolts 5 serving to more securely connect the two-part ratchet to the axle and prevent possible rotation of the two-part ratchet thereon.

I employ plates $e$ $f$ occupying parallel planes and coming at opposite sides of the wheel spokes $b'$ and the planes of which are also parallel to that of the two-part ratchet.

The plate $e$ is preferably provided with lugs $e'$ formed integral therewith and adapted to come between the spokes and which may be of the tapering or diverging form of the spokes from the hub out and contact with the spokes if the parts are made to fit snugly, and I employ bolts 6 which pass through the plate $e$ and lugs $e^1$ and through the plate $f$ and by means of which these plates are securely fastened together and to the spokes of the wheel.

The plate $e$ is preferably provided with an apertured lug to receive the pin 7 of the pawl $g$ in pivotally mounting said pawl to said plate. This pawl is provided with a lug $g^1$ on the end opposite to its engaging tooth and the pawl is so placed that its tooth is adapted to come into contact with the teeth of the two-part or divisible ratchet so as to communicate the power of the rotation of this main wheel to the ratchet and the axle upon which the wheel is loosely mounted, and from the axle to the parts of the machine to be operated.

Pivotally connected to the plate $e$ is a catch-hook $h$ adapted to engage the lug $g^1$ of the pawl when the tooth of the pawl is removed from the ratchet and to hold the pawl in this position out of engagement with the ratchet so that the mechanism or operative parts of the machine are at rest while the machine or agricultural implement is being moved along the road or from place to place and no work is being performed.

I have shown and prefer to employ a helical spring $i$. One end of this spring enters a hole of the plate $e$ and the other end a hole of the pawl $g$; the office of the spring being to keep the tooth of the pawl down against and in engagement with the teeth of the ratchet, consequently when the heel end and lug $g^1$ of the pawl are moved toward and engaged by the catch-hook $h$, said helical spring is under tension. Consequently at the moment that the pawl is released from the catch-hook the spring will draw the tooth of the pawl into engagement with the teeth of the ratchet and consequently if it is desired to hold the pawl out of engagement with the ratchet the heel of the pawl is pushed down and the catch-hook $h$ engaged with the lug $g^1$ of the pawl and the parts are held in this relation until it is desired to again operate the mechanism of the machine by the rotation of the wheel.

While I have shown and prefer to employ the ratchet as made in two parts I do not limit my invention to so doing as the ratchet may be of ordinary character. The plates employed by me and secured to the spokes of the wheel for carrying the pawl device and spring are especially applicable where the spokes of the wheel are of wood, but where cast iron wheels are employed the structure is made in an equivalent manner and to perform the same function of a place of attachment and support for the pawl and helical spring.

The helical spring $i$ as arranged and exposed cannot become clogged with oil and earth and so be rendered inoperative and the tendency to break so common in flat springs is avoided.

I claim as my invention:—

1. The combination with the main axle and a main wheel of an agricultural implement loose on the axle, of a support device adapted for engagment with spokes of the wheel, a pawl pivotally mounted upon said support device, a spring at one end connected to the pawl and at the other end to the said support device, a two-part or divisible ratchet formed with peripheral teeth adapted to lie in a plane parallel to the aforesaid support device and opposite flanges formed with the two parts of said ratchet coming at opposite sides of the axle and extending in a direction away from the peripheral teeth and said support device near which said teeth lie, and bolts passing through said flanges for securing the two-part or divisible ratchet to the main axle.

2. The combination with the main axle and a main wheel of an agricultural implement, of a ratchet secured to the axle, a pawl adapted to engage the ratchet, plate devices and means for securing the same in substantially parallel planes to the spokes of the wheel, a pin for pivotally connecting the pawl to one of said plates, a spring for connecting the pawl to a fixed point, a lug formed with the pawl and a catch-hook connected to the same plate with the pawl and adapted to engage its lug so as to hold the pawl against the tension of the spring out of engagement with the teeth of the ratchet.

3. The combination with the main axle and a main wheel of an agricultural implement, of a ratchet secured to the axle, a pawl adapted to engage the ratchet, a plate having a lug, a pin for pivotally connecting the pawl to said plate, lugs formed with said plate and adapted to fit between the spokes of the wheel while the plate bears against the sides of the spokes, a second plate coming against the opposite sides of the spokes in a parallel plane with the aforesaid plate, bolts passing through the plates and through the lugs for clamping the plates to the spokes, a helical spring connected at one end to the pawl plate and at the other end to the pawl, a lug formed on the pawl and a hook connected to the pawl plate and adapted to engage the lug so as to hold the pawl out of action.

4. The combination with the main axle and a main wheel of an agricultural implement, of a clutch device for connecting the said parts comprising a two-part or divisible ratchet having peripheral teeth and adjacent flanges coming at opposite sides of the axle and bolts for securing the said two-part or divisible ratchet to the said axle, a pawl adapted to engage the teeth of the ratchet, a plate having a lug, a pin for pivotally connecting the pawl to said plate, lugs formed with said plate and adapted to fit between the spokes of the wheel while the plate bears against the sides of the spokes, a second plate coming against the opposite sides of the spokes in a parallel plane with the aforesaid plate, bolts passing through the plates and through the lugs for clamping the plates to the spokes, a helical spring connected at one end to the pawl plate and at the other end to the pawl, a lug formed on the pawl and a hook connected to the pawl plate and adapted to engage the lug so as to hold the pawl out of action.

5. The combination with the main axle and a main wheel of an agricultural implement, of a ratchet secured to the axle, a pawl adapted to engage the ratchet, a support device adapted for engagement with the spokes of the wheel and to which device the pawl is pivotally connected, a spring at one end connected to the pawl and at the other end to the said support device, and devices forming parts of the said pawl and the said support and adapted for holding the pawl away from the ratchet against the tension of the spring.

6. The combination with the main axle and a main wheel of an agricultural implement, of a ratchet secured to the axle, a pawl adapted to engage the ratchet, a support from the spokes of the wheel to which the pawl is pivotally connected, a spring at one end connected to the pawl and at the other end to the said support, a lug formed with the pawl and a catch-hook connected to the support of the pawl and adapted to engage the lug of the pawl so as to hold the same against the tension of the spring out of engagement with the teeth of the ratchet.

Signed by me this 31st day of May 1906.

LEWIS AUGUSTUS ASPINWALL.

Witnesses:
 C. G. ROWLEY,
 GEO. N. WHITNEY.